United States Patent [19]

Clark

[11] 3,977,847

[45] Aug. 31, 1976

[54] FILTRATION METHOD AND APPARATUS

[75] Inventor: Raymond C. Clark, Lake Forest, Ill.

[73] Assignee: Brunswick Corporation, Skokie, Ill.

[22] Filed: Aug. 8, 1975

[21] Appl. No.: 603,083

[52] U.S. Cl. .................................. 55/96; 55/294; 55/302; 55/477; 55/487; 55/488; 55/525; 428/92; 428/95; 428/97
[51] Int. Cl.² ........................................ B01D 46/04
[58] Field of Search .............................. 428/85–97, 428/903; 55/477, 96, 514, 486–488, 524, 525, 526, 302, 294, 97; 210/499, 500, 505, 506

[56] References Cited
UNITED STATES PATENTS

| | | | |
|---|---|---|---|
| 1,995,651 | 3/1935 | Rathbun | 55/294 |
| 2,765,048 | 10/1956 | Hersey, Jr. | 55/294 |
| 2,782,933 | 2/1957 | Monsarrat | 55/477 |
| 3,246,767 | 4/1966 | Pall et al. | 210/506 |
| 3,636,680 | 1/1972 | Seidel | 55/291 |
| 3,697,238 | 10/1972 | Brown et al. | 428/903 |
| 3,898,062 | 8/1975 | Slakey | 55/96 |
| 3,948,623 | 4/1976 | Ostby et al. | 55/96 |

Primary Examiner—Bernard Nozick
Attorney, Agent, or Firm—John G. Heimovics; David S. Guttman

[57] ABSTRACT

A particle laden gas stream is cleaned by passing it through an all metal fabric including a base with pile fibers connected to the base. The flowing gas forces the pile fibers to lie down upon each other to form a depth filter media adapted to entrap fine particles. This depth filter media is cleaned to remove entrapped particles by passing air through the fabric in a direction counter to the direction the particle laden gas flows through the fabric. Consequently, the pile fibers tend to open and extend outwardly from the base, permitting entrapped particles to be carried by the air from the fabric. Apparatus including a tubular element made of an all metal pile fabric is also disclosed. The tubular element has associated with it one or more nozzles adapted to blow air through the fabric along an incremental portion of the tubular element. Consequently, a small portion of the fabric is cleaned while simultaneously the remainder of the fabric filters particles from the gas stream.

23 Claims, 6 Drawing Figures

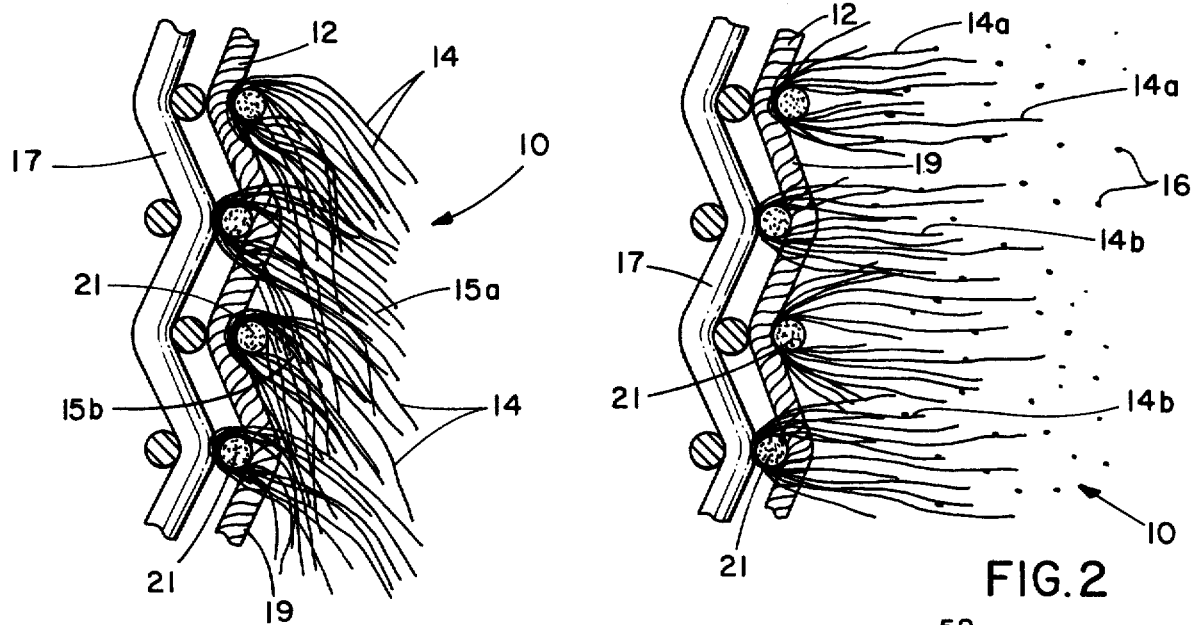
FIG.1
FIG.2
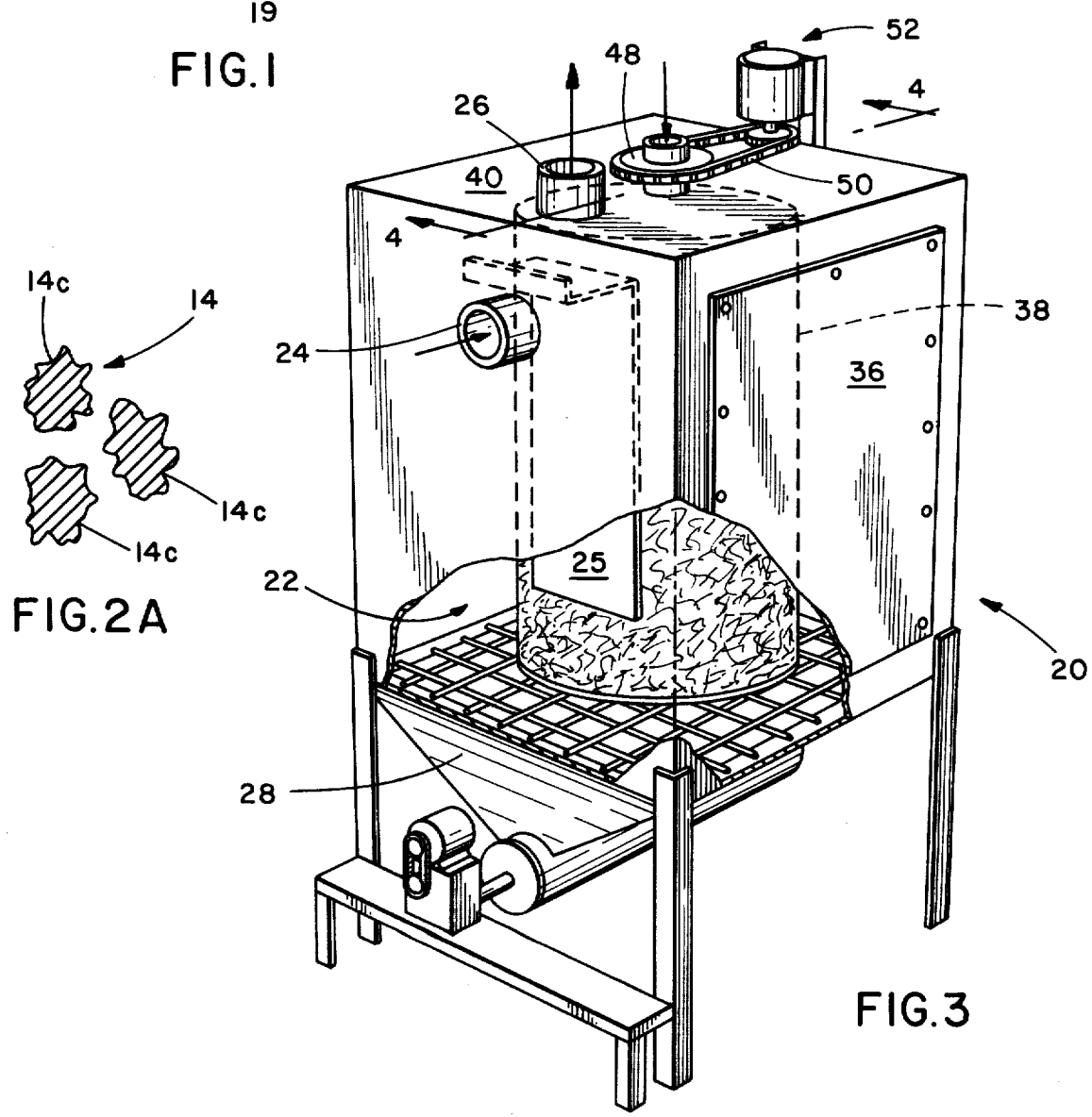
FIG.2A
FIG.3

FILTRATION METHOD AND APPARATUS

BACKGROUND

Presently, fabric filters are used widely by industry to remove particles from a gas. Large volumes of particle laden gas can be treated. For example, bag houses are designed to handle from about 10 to over a million cubic feet per minute of gas.

Bag houses employ a surface filter as opposed to a depth filter. A surface filter collects particles on its surface to form a cake, and this cake is periodically removed by flexing, e.g. shaking the filter. Depth filters comprise randomly entwined fine fibers. When particles contact these fibers they adhere to the fiber. Some particles collect deep within the depth filter, and consequently, it is much more difficult to clean the depth filter than the surface filter. Many depth filters are simply disposed of because they cannot be cleaned conveniently.

Because a depth filter cannot be readily cleaned it is not currently used in bag houses. However, it would be desirable to use a depth filter, because depth filters would permit the size of the bag houses to be reduced substantially. This is due to the greater dirt holding capacity of the depth filter, permitting a larger volume of gas to be processed before the pressure drop across the filter exceeds the design level for the system. Surface filters, in general, cannot withstand as large a pressure drop as depth filters.

One additional problem normally associated with bag houses is that the surface filters used are made of organic materials which cannot resist high temperatures and corrosive environments. It would be highly desirable to employ in bag houses filter media which could resist hostile environments. Presently, because the fabrics cannot resist high temperatures, hot gas must be cooled.

THE INVENTION

I have invented a method for removing particles from a gas stream which employs a depth filter which may be cleaned and is adapted to function at high temperatures and in corrosive environments.

According to my method, gas is passed through a depth filter made essentially solely of metal. This filter is a fabric including a base and pile connected to the base. This fabric may be made by conventional techniques such as knitting, tufting or weaving. The pile is made from textile metal fibers having a diameter of less than about 50 microns and a rough, unmachined, unburnished, fracture-free surface. These pile fibers lie down upon each other to form the depth filter media as the particle laden gas flows through the filter. Preferably the fibers have a diameter ranging between 1 and 25 microns. A suitable pile height may range between ⅛ and 1¼ inches. Stainless steel is the most preferred alloy, but other suitable metal alloys are Driver Harris-242 and Karma. However, any corrosion and temperature resistant alloy may be used. The density of the filter media formed by the fibers may range between 0.1 and 15 percent (density equals the volume occupied by the fibers, divided by the total volume of the depth filter, multiplied by 100).

In a preferred form, the pile fibers have long fibers interdispersed with short fibers. Preferably, the short fibers have a smaller diameter than the long fibers, for example, the long fibers' diameter may be from 2 to 4 times larger than the short fibers' diameter.

Because both short and long fibers are used, two layers of fibers are formed as particle laden gas flows through the filter. The first layer which the gas encounters is the least dense layer. Generally this layer has a density ranging between 0.1 and 3 percent. The second or denser layer has a density ranging between 2 percent and 10 percent. Preferably, there is a gradual increase in density along a transition layer of fibers formed between the low density and high density layers.

Heretofore, it has been very difficult if not impossible to clean a depth filter media. I obviate this problem and clean the depth filter media employed in my method by passing clean gas through the filter in a direction counter to the direction that the particle laden gas stream flows through the filter. Consequently, the pile fibers open and extend outwardly from the base, permitting entrapped particles or particle agglomerates to be carried by the cleaning gas, out of the filter. Preferably, the cleaning gas is heated to a temperature above the dew point of the particle laden gas. This keeps the fabric hot so that moisture or corrosive acids do not condense on the fabric. Heating the cleaning gas also avoids a potential problem caused by water and solid material forming a cement-like cake on the fabric which would be difficult or impossible to remove. To assist in cleaning, it is also required in some circumstances to agitate the pile fibers, for example, by vibration.

My method is particularly adapted to treat particle laden gas streams having a temperature in excess of 500°F and including particles having a diameter of less than 15 microns. Gas streams including particles having an average diameter ranging between 15 and 1 micron or less are most readily cleaned by my method.

I have also invented an apparatus particularly adapted to practice my method. This apparatus includes a chamber having an inlet and an outlet and a depth filter element disposed within the chamber made essentially solely of metal. This element has a base with pile fibers extending from the base. The element is disposed within the chamber so that as the particle laden gas flows into the chamber it forces the pile fibers to lie down upon each other to form a depth filter media. Means are provided for cleaning the depth filter media by passing pressurized cleaning gas such as air through the filter media in a direction counter to the direction of the gas flow. This causes the fibers to open and extend outwardly from the base, permitting entrapped particles or particle agglomerates to be carried from the filter.

In the preferred form, the element is a tube and the cleaning means are disposed inside the tube. The preferred cleaning means includes a nozzle having an area substantially less than the area of the tubular element. This nozzle is adapted to revolve or traverse the tubular elements inside the surface and blow air through a small incremental portion of the tubular element as the cleaning means traverses the element.

Preferably the apparatus is designed so that the ratio of the volume of cleaning gas to the volume of the particle laden gas flowing through the apparatus ranges between about 1:1000 and 1:3. The apparatus may also be equipped with heating means and insulation for heating or maintaining the cleaning air at a temperature sufficiently high to avoid condensation within the apparatus.

THE DRAWINGS

FIG. 1 is a cross sectional view of the depth filter used in my method.

FIG. 2 is a cross sectional view of the depth filter of FIG. 1 being cleaned.

FIG. 2a is a cross section of the pile fibers illustrating their rough, unmachined, unburnished, fracture free surface.

FIG. 3 is a perspective view, with a section broken away, of the apparatus of my invention.

DETAILED DESCRIPTION OF THE INVENTION

Figure 4:
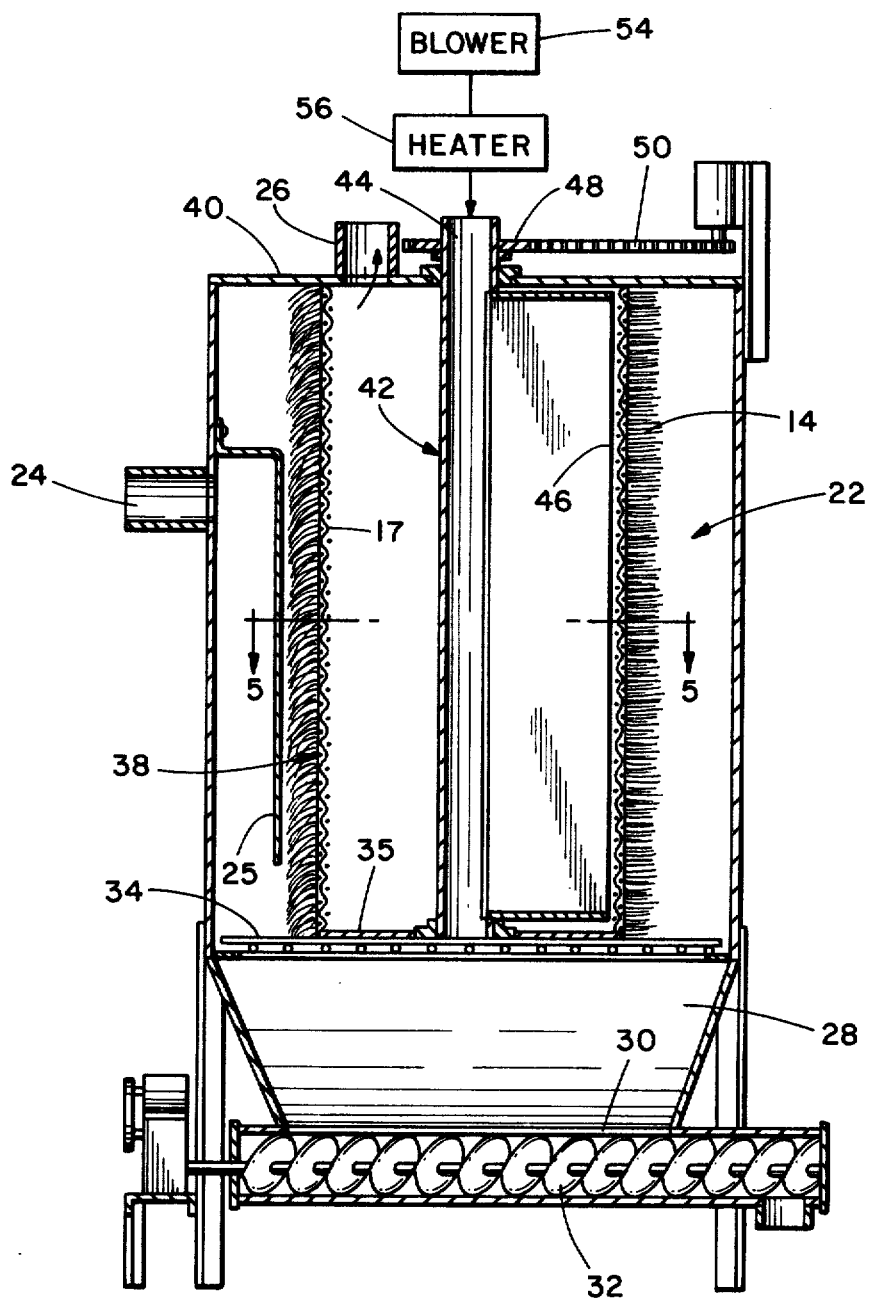
FIG. 4 is a cross sectional view taken along line 4—4.

FIGS. 1 and 2 schematically depict my method for removing particles from a stream of gas. The central feature of my method is the use of an all metal fabric 10 having a base 12 such as a porous scrim and a plurality of metal pile fibers 14 connected to the base. The base may be woven and includes warp and fill yarns 19 and 21, respectively. The pile fibers 14 are wrapped around the fill yarns and held snug in position by the warp yarns 19. The fabric 10 is supported by a wire screen 17.

As best shown in FIG. 2, there are long fibers 14a interdispersed in a random fashion among short fibers 14b. Preferably, the long fibers have a larger diameter than the short fibers. As the particle laden gas stream flows through the fabric as illustrated in FIG. 1, the pile fibers 14 lie down upon each other to form a depth filter media. Because both long and short pile fibers are employed, a low density layer 15a and higher density layer 15b are formed. Large particles tend to collect in the lower density layer 15a, and small particles tend to collect in the higher density layer 15b.

As shown in FIG. 2a, the metal pile fibers 14 have a rough, unmachined, unburnished, fracture-free surface 14c. This rough surface 14c facilitates collection of fine particles, i.e. particles having a diameter of about 15 microns or less. These fine particles stick to the rough surface 14c and act as sites at which large agglomerates grow by a gradual build up of particles. In other words, small particles in the particle laden gas stream adhere to particles already attached to the rough surface 14c to form large agglomerates which are removed from the filter media during cleaning and then collected.

Eventually the pressure drop across the depth filter media increases to the point where it is desirable to clean the depth filter media. Cleaning is achieved by simply passing a current of gas through the fabric 10 in a direction counter to the flow of the particle laden gas stream. This is illustrated in FIG. 2. As the reverse gas current passes through the fabric 10, the pile fibers 14 open and extend outwardly from the base, permitting a major portion of the entrapped particles and particle agglomerates 16 collected by the fibers to release and become entrained with the reverse current of gas out of the fabric. Since the agglomerates are substantially larger and heavier than the particles carried in the incoming gas stream, these agglomerates fall downward due to gravity and are collected. In some instances, it is desirable to agitate the fibers, for example, by mechanical means which vibrate the fabric and thereby assist in removal of entrapped particles.

Figure 5:
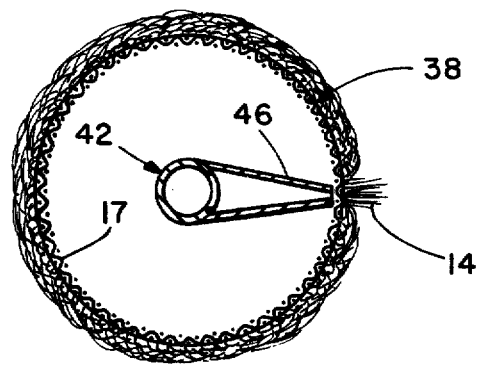
FIG. 5 is a cross sectional view taken along line 5—5 of FIG. 4.

FIGS. 3 through 5 illustrate my apparatus 20 which is designed to carry out my novel method for removing particles from a gas stream. This apparatus 20 includes a chamber 22 having an inlet 24 and outlet 26. At the inlet 24 is a striker plate 25 which serves to remove large particles from the incoming gas stream. Such large particles strike the plate 25 and fall downward. The bottom of the chamber 22 tapers downwardly to form a hopper section 28 at which there is a trough 30 holding an auger 32. A grate 34 provides an elevated floor above the hopper section 28. In one side of the chamber 22 is a door 36 to permit entry, and disposed within the chamber is a tubular element 38 made of the all metal fabric described above. This tubular member 38 has its top attached to the roof 40 of the chamber 22 underneath the opening in the outlet 26, and its bottom connected to the grate 34. The bottom of the tubular element 38 is closed off by plate 35 so that the particle laden gas stream entering the inlet will pass through the sidewall of the tubular element into its interior, with filtered gas exiting the apparatus 20 via the outlet 26. Disposed inside the tubular member 38 is a rotatable cleaning device 42, including a hollow shaft 44 having a nozzle 46 attached to this hollow shaft. At the top of the shaft is a sprocket 48 connected by a chain 50 to a motor drive 52.

In operation, a particle laden gas stream flows into the inlet 24 of the chamber 22, and through the wall of the tubular element 38. As gas flows through the tubular element 38, the pile fibers 14 lie down upon each other as illustrated in FIG. 5. This forms the depth filter which collects particles. Simultaneously, the cleaning device 42 is revolving. Cleaning gas is forced through the hollow shaft 44 and into the nozzle 46. Thus, as the cleaning device advances, high velocity gas exits through a small increment of the wall of the tubular element 38. This causes the pile fibers 14 to open and extend outward from the base of the tubular element 38. This occurs only along the incremental portion of the tubular element 38 adjacent the tip of the nozzle 46. Agglomerates formed in the depth filter are blown by the air stream out of the fabric, and these agglomerates fall into the hopper section 28 and are collected in the trough 30 and removed by the auger 32 from the chamber 22. Purified gas leaves the chamber 22 by the outlet 26.

In the preferred arrangement, cleaning gas is forced by a blower 54 through a heater 56 into a hollow shaft. The heater 56 heats the cleaning gas to a temperature above the dew point of the particle laden gas so that any moisture in the cleaning gas does not condense on the depth filter. This is desirable in order to prevent forming a calcified material which would be very difficult to remove from the depth filter and/or the formation of aqueous condensates of corrosive acids.

The volume of cleaning gas forced through the tubular member relative to the volume of particle laden gas entering into the chamber 22 is controlled by adjusting the nozzle size and/or velocity of cleaning gas relative to the process gas flow capacity of the apparatus. For example, the ratio of the cleaning gas to the volume of particle laden gas should range between 1:1000 and 1:3.

I claim:

1. A method of removing particles from a stream of gas comprising:
    passing the gas through a depth filter comprising a porous fabric made essentially solely of metal and including base and pile connected to said base, said pile being made from metal fibers having a diameter of less than 50 microns, said pile fibers being flexible and free to move relative to each other, and cleaning the depth filters to remove particles entrapped in the pile fibers by passing cleaning gas through the filter in a direction counter to the direction said particle laden gas flows through the fliter, said pile fibers lying down upon each other to form the depth filter as the particle laden gas impinges against the pile fibers and opening and extending outwardly from the base permitting entrapped particles or particle agglomerates to be entrained by the cleaning gas and carried out of the filter as the cleaning gas flows through the fabric.

2. The method of claim 1 where the depth filter media is vibrated during cleaning.

3. The method of claim 1 where the cleaning gas is at a temperature above the dew point of the particle laden gas so that moisture does not condense on the fibers.

4. The method of claim 1 where the depth filter is adapted to remove particles having an average diameter of 15 microns or less.

5. The method of claim 1 where the fibers have a diameter ranging between 1 and 25 microns.

6. The method of claim 1 where the fibers are made of corrosion resistant alloy.

7. The method of claim 1 where the density of the pile fibers ranges between 0.1 and 15%.

8. The method of claim 1 where the pile fibers have a height ranging between ⅛ and 1¼ inch.

9. The method of claim 1 where relatively long pile fibers are interdispersed with relatively short pile fibers.

10. The method of claim 9 where the long pile fibers have a larger diameter than the short pile fibers.

11. The method of claim 9 where the low and high density layers are formed such that the particle laden gas first flows through the low density layer and then through the higher density layer.

12. Apparatus for removing particles from a gas stream including:
a chamber having an inlet and outlet,
a depth filter comprising a porous fabric made essentially solely of metal having a base with metal pile fibers connected to the base, said pile fibers being flexible and free to move relatively to each other,
means of mounting said filter in the chamber so that a particle laden gas stream as it flows between the inlet and outlet passes through the filter impinges against the pile fibers so that the pile fibers lie down upon each other to form the depth filter, and
means for cleaning the filter to remove particles entrapped in the pile by passing cleaning gas through the filter in a direction counter to the direction said particle laden gas flows through the filter, so that the pile tends to open and extend outwardly from the base, permitting the entrapped particles or particle agglomerates to be entrained by the cleaning gas and carried out of the element.

13. The apparatus of claim 12 where the fabric includes pile fibers having a diameter of less than 50 microns.

14. The apparatus of claim 13 where the pile fibers have an average diameter range between 1 and 25 microns.

15. The apparatus of claim 14 where the pile fibers are made of a corrosion resistant alloy.

16. The apparatus of claim 15 where the pile fibers have a density range between 0.1 and 15%.

17. The apparatus of claim 15 where the pile fibers have different lengths with long fibers being interdispersed with shorter fibers.

18. The apparatus of claim 17 where the long fibers have a larger diameter than the short fibers.

19. The apparatus of claim 17 where the filter fabric includes a low and high density layer with the particle laden gas flowing first through the low density layer and then through the high density layer.

20. The apparatus of claim 12 including means for heating the cleaning gas prior to forcing the cleaning gas through the element.

21. The apparatus of claim 12 where the cleaning means includes a nozzle adapted to force cleaning gas through a small incremental portion of the element.

22. The apparatus of claim 21 where the element has a tubular configuration and the cleaning means is inside the element.

23. The apparatus of claim 22 where the cleaning means is adapted to revolve.

* * * * *